(12) United States Patent
Folden et al.

(10) Patent No.: US 8,159,396 B2
(45) Date of Patent: Apr. 17, 2012

(54) WIRELESS PROXIMITY PROBE AND METHOD OF OPERATING SAME

(75) Inventors: Dwayne Andrew Folden, Gardnerville, NV (US); Boris Leonid Sheikman, Minden, NV (US)

(73) Assignee: General Electric Company, Schenectady, NY (US)

( * ) Notice: Subject to any disclaimer, the term of this patent is extended or adjusted under 35 U.S.C. 154(b) by 426 days.

(21) Appl. No.: 12/610,048

(22) Filed: Oct. 30, 2009

(65) Prior Publication Data

US 2011/0102266 A1 May 5, 2011

(51) Int. Cl.
*G01S 3/02* (2006.01)
(52) U.S. Cl. ........................................ 342/458
(58) Field of Classification Search .................. 342/458
See application file for complete search history.

(56) References Cited

U.S. PATENT DOCUMENTS

| | | | | |
|---|---|---|---|---|
| 4,384,819 A | * | 5/1983 | Baker | 415/14 |
| 5,956,626 A | * | 9/1999 | Kaschke et al. | 455/115.1 |
| 6,778,141 B1 | | 8/2004 | Yeh | |
| 6,977,613 B2 | | 12/2005 | He et al. | |
| 7,053,629 B2 | | 5/2006 | Nevermann | |
| 7,283,096 B2 | | 10/2007 | Geisheimer et al. | |
| 7,511,513 B2 | * | 3/2009 | Nevermann | 324/644 |
| 2003/0062907 A1 | * | 4/2003 | Nevermann | 324/637 |

* cited by examiner

*Primary Examiner* — Thomas Tarcza
*Assistant Examiner* — Frank McGue
(74) *Attorney, Agent, or Firm* — Armstrong Teasdale LLP

(57) ABSTRACT

A proximity probe, for use in determining a distance to a probe target, includes a first antenna configured to wirelessly receive a radio-frequency signal at a first predetermined frequency and a converter configured to convert the received signal to a driving signal and to an electrical signal. The proximity probe also includes a second antenna configured to receive power via the driving signal and to generate a signal indicative of a distance from the proximity probe to the probe target, and a third antenna configured to transmit the generated signal.

20 Claims, 4 Drawing Sheets

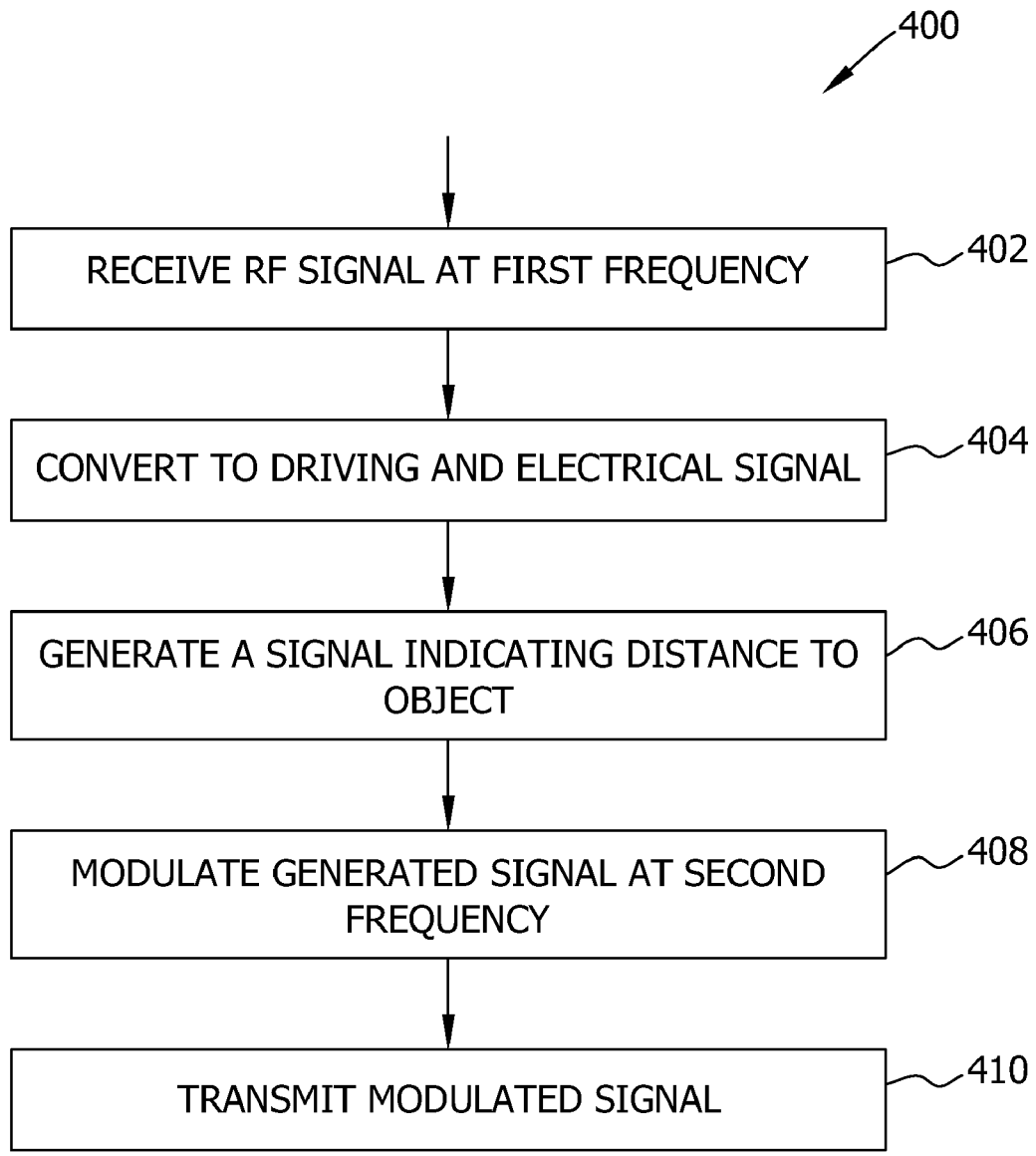

WIRELESS PROXIMITY PROBE AND METHOD OF OPERATING SAME

BACKGROUND OF THE INVENTION

The invention relates generally to proximity probes, and more particular, to an apparatus and method for operating a proximity probe for detecting a proximity to a probe target in which the proximity probe is wirelessly coupled to a power source.

During use, known proximity probes are used to detect a distance between the proximity probe and a target object, such as a turbine shaft. The data obtained by the probe can be used to accurately measure the vibration that the shaft is experiencing. Such vibrations can be indicative of wear of the bearing or the shaft, or of an unbalanced shaft.

Some known proximity probes are eddy current (EC) devices that measure the interaction between an electromagnetic field generated by the EC device and the target object being measured. At least some of such known EC devices include a sensing coil that generates a magnetic field. When the sensing coil is positioned adjacent to a conductive component, an eddy current is generated across a surface of the component. The EC device measures the generated eddy current and converts the measurement to an electrical signal that is transmitted to a device that interprets the measurement. Moreover, known EC devices include physical wires that couple the EC device to a power supply and for connections that enable the transmission of the electrical signals representing the EC device's measurements.

At least some other known proximity probes use microwaves to detect the proximity of the target object to the probe. Such probes use an antenna, such as patch antennas or microstrip antennas, to transmit the microwaves. Similar to known EC probes, microwave proximity probes also include physical wires to enable connections to a power supply and/or connections to enable the transmission of the electrical signals representing the proximity probe's measurements. Similar to the function of a transformer, some known electronic devices are capable of receiving electrical power wirelessly, but use magnetic wire wound coils to magnetically couple with a second coil that is physically connected to a power source. Generally, known magnetic wire wound coils are larger than the antennas used to transmit and/or receive microwave signals, and as such, such coils may be expensive to manufacture and may increase the mass of the device in which the coils are installed.

FIG. 1 is a block diagram illustrating an exemplary known proximity probe system 100 that includes a known eddy current (EC) proximity probe 102. Known state-of-the-art probes 102 include physical power wires 104 that enable probe 102 to be coupled to a power source 106 and/or physical data wires 108 used to transmit collected data relative to the distance measured between a metallic target object 110 and EC proximity probe 102 to a data collection receiver 112. Other state-of-the-art known probes are microwave probes 114 that use transmitting and receiving microwave antennas to measure the distance between microwave probes 114 and a target object 116. With such probes, target object 116 may be metallic, non-metallic, or any other material that is detectable by microwave probe 114. Similar to EC probes 102, known microwave probes 114 also require physical power wires 104 to receive power from power source 106 and/or physical data wires 108 to transmit data representing the distance between microwave probes 114 and target objects 116.

Lastly, known state-of-the-art proximity probes that need physical wires to provide electrical power and/or carry data transmission can require complex wiring schemes. Over time, such wiring and associated electrical connections may fail. Moreover, the physical constraints of wiring can limit the areas that the proximity probes may be positioned relative to a target object.

BRIEF DESCRIPTION OF THE INVENTION

In one aspect, a proximity probe for use in determining a distance to a probe target includes a first antenna configured to wirelessly receive a radio-frequency signal at a first predetermined frequency and a converter configured to convert the received signal to a driving signal and to an electrical signal. The proximity probe also includes a second antenna powered via the driving signal, wherein the second antenna is configured to generate a signal indicative of a distance from said proximity probe to the probe target, and a third antenna configured to transmit the generated signal.

In another aspect, a wireless proximity detection system includes a transmitter configured to wirelessly transmit a high-power radio-frequency signal at a first predetermined frequency, a receiver configured to wirelessly receive a radio-frequency signal at a second predetermined frequency, and at least one proximity probe. The proximity probe includes a first antenna configured to wirelessly receive the high-power radio-frequency signal, a converter configured to convert the received signal to a driving signal and to an electrical signal, a second antenna powered via the driving signal, wherein the second antenna is configured to generate a signal indicative of a distance from the at least one proximity probe to the probe target, and a third antenna configured to transmit the generated signal.

In yet another aspect, a method of detecting a proximity of a probe target from a wireless proximity probe includes receiving, at a first antenna, a radio-frequency signal at a first predetermined frequency, and converting the radio-frequency signal to a driving signal and an electrical signal. The method also includes generating, at a second antenna, a signal indicative of a distance from the proximity probe to the probe target, modulating the generated signal at a second predetermined frequency that is different than the first predetermined frequency, and transmitting the modulated signal via a third antenna.

BRIEF DESCRIPTION OF THE DRAWINGS

FIG. 4 is a flow chart of an exemplary method of operating the system shown in FIG. 3 using the apparatus shown in FIG. 2.

DETAILED DESCRIPTION OF THE INVENTION

The present application describes a wireless proximity probe that is suitable for placement in environments where the use of wires may be problematic or inconvenient. Use of wireless proximity probes eliminates the need to extend cables to the proximity probes that are used to monitor an object. Installing cables may be time consuming, expensive, and/or difficult. As such, the present application describes a proximity probe that does not require wires for each probe, but merely uses a transmitting device coupled to a power supply, and a receiving device coupled to receive proximity measurements, from one or more wireless proximity probes.

Figure 1:
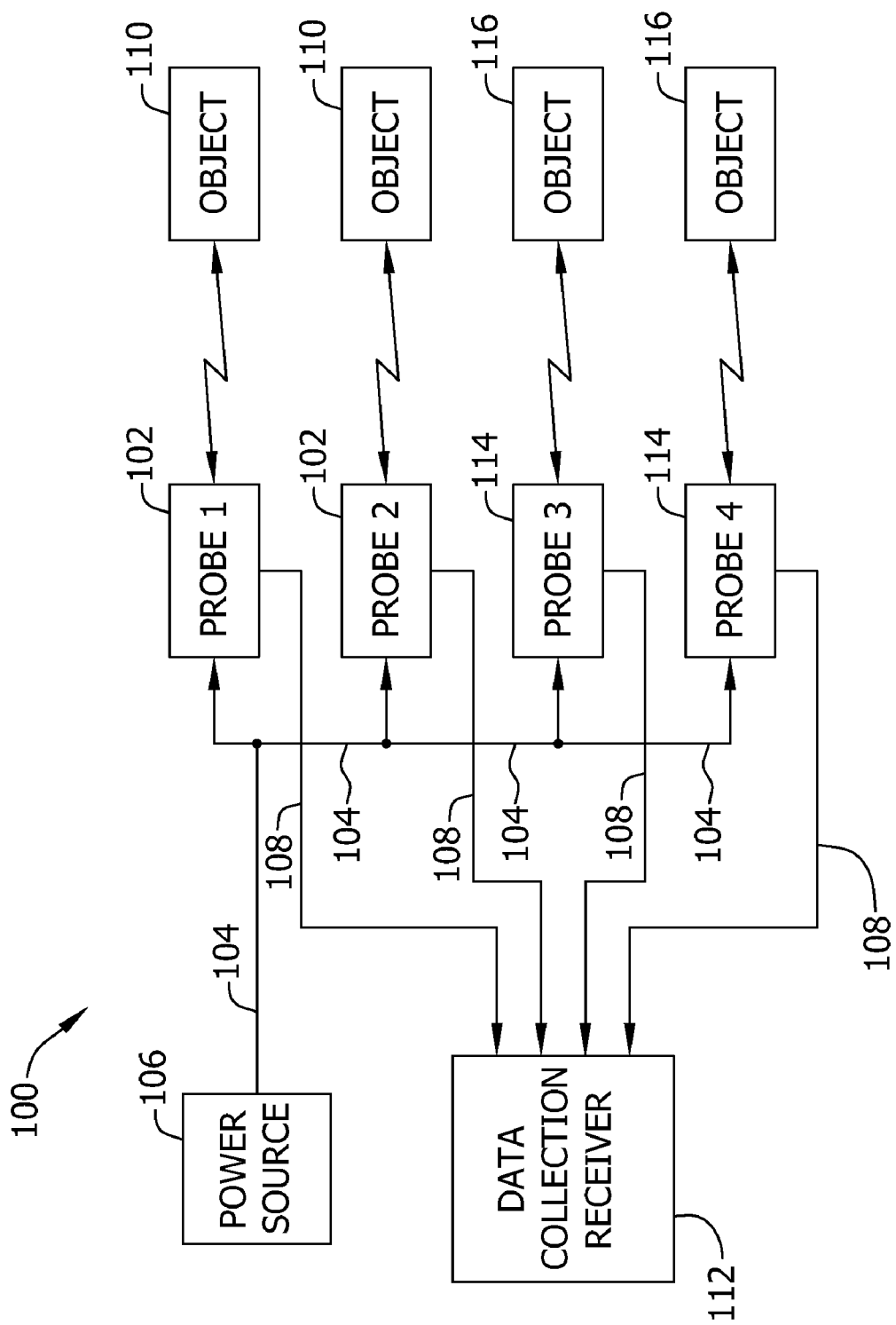
FIG. 1 is a block diagram illustrating an exemplary known proximity probe system.
Figure 2:
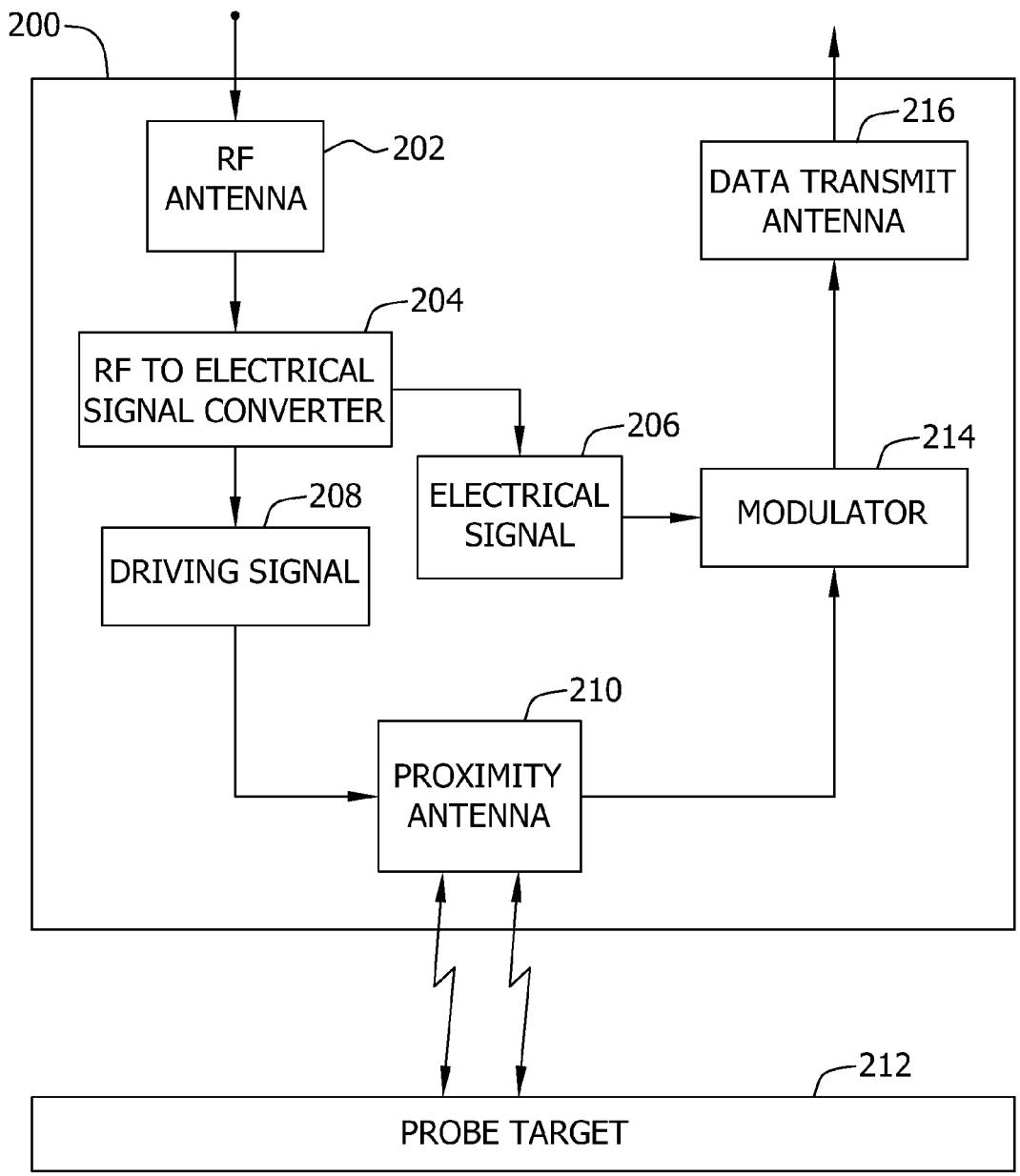
FIG. 2 is a block diagram illustrating an exemplary wireless proximity probe.

FIG. 2 is a block diagram illustrating an exemplary wireless proximity probe 200. In the exemplary embodiment, probe 200 continuously measures and/or monitors rotating machinery components, such as, rotating machinery components in a turbine. In another embodiment, probe 200 operates non-continuously and only measures and/or monitors when requested or when receiving a radio-frequency (RF) signal capable of powering probe 200. In yet another embodiment, probe 200 includes an energy storage device (not shown), such as a rechargeable battery or a capacitor, that enables probe 200 to transmit for a period of time after having stored received energy in the energy storage device while receiving the RF signal. In a further embodiment, probe 200 measures and/or monitors non-rotating machinery components.

In the exemplary embodiment, probe 200 includes a first antenna 202 that receives radio-frequency (RF) signals at a first predetermined frequency. A converter 204 separates received RF signals into an electrical signal 206 and an RF-driving signal 208. In the exemplary embodiment, the first predetermined frequency is approximately five Ghz (Gigahertz) and the RF signal is a high-power microwave signal. In one embodiment, the received RF signal includes at least one free-space radio-frequency signal, such as a television station RF signal or an AM/FM radio station RF signal. In other embodiments, the first predetermined frequency may be any suitable frequency that enables proximity probe 200 to function as described herein. In the exemplary embodiment, electrical signal 206 is a rectified direct-current (DC) electrical signal, and RF driving signal 208 is an alternating current (AC) electrical signal that has a frequency that matches the received RF signal. In other embodiments, electrical signal 206 is an alternating-current (AC) electrical signal, and the frequency of RF driving signal 208 is converted by converter 204 to be a signal that is different than the frequency of the received RF signal.

In the exemplary embodiment, RF driving signal 208 provides power to a proximity antenna 210 to enable a distance to a probe target 212 to be detected, by measuring a distance to probe target 212. In the exemplary embodiment, proximity antenna 210 uses microwaves to measure a distance to probe target 212. Alternatively, proximity antenna 210 may use any other suitable RF signals that enable proximity antenna 210 to detect the distance to probe target 212 a described herein. Moreover, in the exemplary embodiment, a modulator 214, powered by electrical signal 206, modulates the measurements at a second predetermined frequency that is different than the first predetermined frequency, and transmits modulated signals via a third antenna 216. In the exemplary embodiment, the second predetermined frequency is approximately three Ghz (Gigahertz). In other embodiments, the second predetermined frequency may be any suitable frequency that enables third antenna 216 to transmit the measurements. Alternatively, in other embodiments, each wireless proximity probe 200 uses a different second predetermined frequency to enable multiple proximity probes 200 to operate substantially simultaneously without interference from other proximity probes 200.

In the exemplary embodiment, probe 200 operates continuously, as long as it is receiving an RF signal adequate to provide power to probe 200. In another embodiment, wireless proximity probe 200 operates non-continuously and only modulates and transmits proximity measurements when requested or after receiving a radio-frequency (RF) signal capable of powering probe 200. In a further embodiment, wireless proximity probe 200 includes an energy storage device (not shown) that enables probe 200 to transmit for a period of time using energy stored in the energy storage device during receipt of the high-power RF signal.

Figure 3:
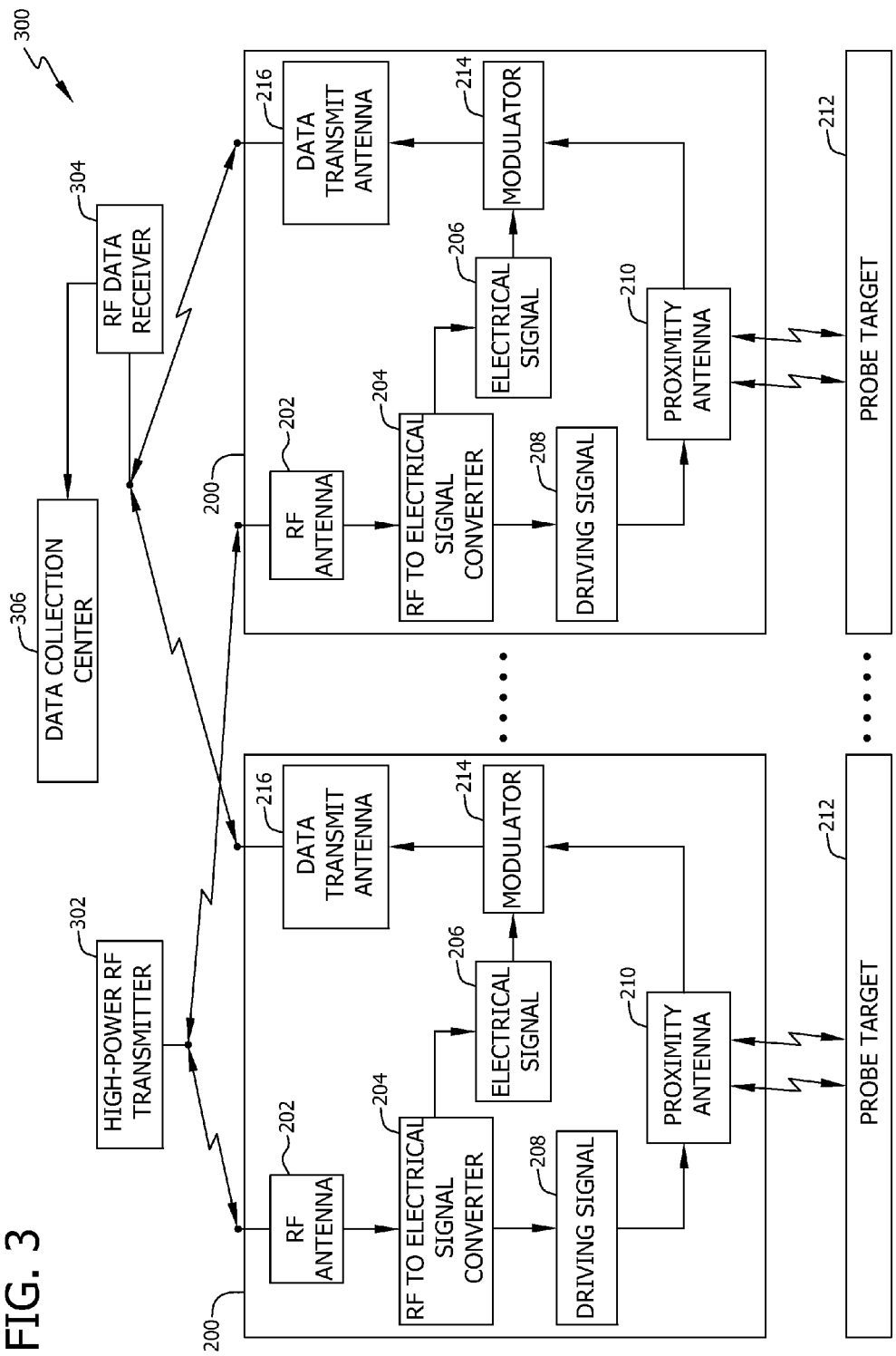
FIG. 3 is a block diagram illustrating an exemplary system for use in detecting the proximity of an object to the proximity probe shown in FIG. 2.

FIG. 3 is a block diagram illustrating an exemplary system 300 for use in detecting the distance to a probe target, such as probe target 212, using the exemplary wireless proximity probe 200 (shown in FIG. 2.) In the exemplary embodiment, system 300 includes a high-power RF transmitter 302 that transmits a high-power RF signal at a predetermined first frequency for use in powering probe 200. More specifically, in the exemplary embodiment, the high-power RF signal is a high-power microwave signal that is capable of powering probe 200, and the predetermined first frequency is approximately five Ghz (Gigahertz). In other embodiments, the high-power RF signal may be any other suitable RF signal, and the first predetermined frequency may be any suitable frequency, that enables system 300 to wirelessly power proximity probe 200 as described herein. Wireless proximity probe 200, when powered by the high-power RF signal, detects the proximity of probe target 212 relative to probe 200, and transmits a modulated RF signal at a second predetermined frequency to RF data receiver 304. The modulated RF signal includes a measurement that is indicative of a distance to probe target 212 from probe 200. In the exemplary embodiment, probe 200 uses microwaves to detect the distance from probe 200 to probe target 212. Moreover, in the exemplary embodiment, the second predetermined frequency is an approximately three Ghz (Gigahertz) microwave signal. In other embodiments, probe 200 may use any other suitable RF signals that enable the proximity to be detected and that may be modulated as described herein. In the exemplary embodiment, RF data receiver 304 is communicatively coupled to a data collection center 306 that receives proximity measurements transmitted from receiver 304.

In the exemplary embodiment, proximity probe 200 continuously transmits proximity measurements as long as probe 200 receives an RF signal that is adequate to power probe 200. In other embodiments, proximity probe 200 operates continuously but transmits proximity measurements when requested, or, alternatively, proximity probe 200 operates continuously but transmits proximity measurements periodically. In a further embodiment, wireless proximity probe 200 includes an energy storage device (not shown) that enables probe 200 to transmit proximity measurements for a period of time using energy that is stored in the energy storage device when receiving a high-power RF signal. Using such an energy storage device enables the use of a directional RF transmitter 302 to continuously transmit a lower power RF signal to be stored in the energy storage device of proximity probes 200 such that proximity probes 200 periodically transmit proximity measurements, or, alternatively, enables the use of a higher-power RF signal transmitter 302 in a periodic mode of operation rather than a continuous mode of operation, while still providing proximity measurements via probe 200.

FIG. 4 is a flow chart of an exemplary method 400 that may be used wirelessly to determine a distance from probe 200 and probe object 212 using system 300 (shown in FIG. 3) and probe 200 (shown in FIG. 2.) In the exemplary embodiment, the method 400 includes receiving 402, at a first antenna, an RF signal at a first predetermined frequency. In the exemplary embodiment, the first predetermined frequency is approximately five Ghz (Gigahertz.) Alternatively, the first predetermined frequency may be any frequency that enables probe 200 and system 300 to function as described herein. In the exemplary embodiment, the method also includes converting 404, via a converter, such as converter 204 (shown in FIG. 2), the received RF signal to a driving signal, such as driving signal 208 and to an electrical signal, such as electrical signal 206, and then generating 406, via proximity antenna 210, a signal indicative of a proximity of probe object 212 relative to probe 200. Moreover, in the exemplary embodiment, method 400 includes modulating 408 the generated signal at a second predetermined frequency of approximately three Ghz (Gigahertz). In one embodiment, the second predetermined frequency may be any frequency that enables method 400 and system 300 to function as described herein, wherein the second predetermined frequency is different than the first predetermined frequency. Further, in the exemplary embodiment, method 400 also includes transmitting 410 the modulated frequency via data transmitting antenna 216 to an RF data receiver, such as receiver 304.

In the exemplary embodiment, when the received RF signal is converted 404, the RF signal is converted 404 to an AC driving signal and to a rectified DC electrical signal. Alternatively, the RF signal may be converted 404 into an AC driving signal and an AC electrical signal. Moreover, in another embodiment, at least one free-space radio-frequency signal is received 402 as described above. Further, in yet another embodiment, a signal is generated 406 non-continuously, wherein probe 200 only modulates 408 and transmits 410 proximity measurements when requested or after receiving 402 a radio-frequency (RF) signal capable of powering probe 200. Furthermore, in another embodiment, a signal is generated 406 non-continuously, wherein probe 200 includes an energy storage device (not shown) that enables the probe 200 to generate 406, to modulate 408, and to transmit 410 proximity measurements for a period of time using energy stored in the energy storage device while receiving 402 the RF signal. Lastly, in yet another embodiment, the position of the probe target 212 is fixed when a signal is generated 406.

The use of wireless proximity probes in a turbine engine to measure the distance between the probes and the probe target can provide flexibility in the placement of the probes where such flexibility does not exist using probes that require wiring for power and/or data connections. Moreover, removing the need to maintain and/or replace wiring to individual probes can reduce the maintenance costs associated with operating a turbine engine, or any other device that may use the wireless proximity probes described herein.

Exemplary embodiments of wireless proximity probes, and systems and methods for using the wireless proximity probes, are described in detail above. The above embodiments may be implemented to monitor stationary and/or moving probe targets, including metallic and non-metallic probe targets, using microwaves and/or other suitable RF signals. References to "one embodiment" in the above description are not intended to be interpreted as excluding the existence of additional embodiments that also incorporate the recited features.

Although the system, methods, and apparatus described herein are described in the context of using a proximity sensor for use in measuring distances between a probe and a probe target, specifically for measurements of components of a turbine, it should be understood that the system, methods, and apparatus, are not limited to use with only a turbine. Likewise, the system components illustrated are not limited to the specific embodiments described herein, but rather, system components can be utilized independently and separately from other components described herein.

While the above has been described in terms of various specific embodiments, those skilled in the art will recognize that the claims and described embodiments can be practiced with modification within the spirit and scope of the claims.

What is claimed is:

1. A proximity probe for use in determining a distance to a probe target, said proximity probe comprising:
   a first antenna configured to wirelessly receive a radio-frequency signal at a first predetermined frequency;
   a converter configured to convert the received signal to a driving signal and to an electrical signal;
   a second antenna powered via the driving signal, said second antenna configured to generate a signal indicative of a distance from said proximity probe to the probe target; and
   a third antenna configured to transmit the generated signal.

2. A proximity probe in accordance with claim 1, further comprising a modulator configured to:
   receive power via the electrical signal;
   modulate the generated signal at a second predetermined frequency that is different than the first predetermined frequency; and
   transmit the modulated signal via said third antenna.

3. A proximity probe in accordance with claim 1 wherein the driving signal comprises an alternating current (AC) electrical signal and the electrical signal comprises a rectified direct current (DC) electrical signal.

4. A proximity probe in accordance with claim 1 further comprising at least one energy storage device configured to store received power via the electrical signal and to transmit power to said modulator.

5. A proximity probe in accordance with claim 1 wherein the received radio-frequency signal comprises one of a high-power microwave signal and at least one free-space radio-frequency signal.

6. A proximity probe in accordance with claim 1 further configured to operate non-continuously.

7. A proximity probe in accordance with claim 1 wherein a position of the probe target is fixed when said second antenna generates the signal.

8. A wireless proximity detection system comprising:
   a transmitter configured to wirelessly transmit a high-power radio-frequency signal at a first predetermined frequency;
   a receiver configured to wirelessly receive a radio-frequency signal at a second predetermined frequency; and
   at least one proximity probe comprising:
      a first antenna configured to wirelessly receive the high-power radio-frequency signal;
      a converter configured to convert the received signal to a driving signal and to an electrical signal;
      a second antenna powered via the driving signal, said second antenna configured to generate a signal indicative of a distance from said at least one proximity probe to the probe target; and
      a third antenna configured to transmit the generated signal.

9. A wireless proximity detection system in accordance with claim 8, wherein said at least one proximity probe further comprises a modulator configured to:
   receive power via the electrical signal;
   modulate the generated signal at a second predetermined frequency that is different than the first predetermined frequency; and
   transmit the modulated signal via said third antenna.

10. A wireless proximity detection system in accordance with claim 9 wherein said at least one proximity probe further comprises at least one energy storage device configured to store received power via the electrical signal and to transmit power to said modulator.

11. A wireless proximity detection system in accordance with claim 8 wherein the converted driving signal comprises an alternating current (AC) electrical signal and the converted electrical signal comprises a rectified direct current (DC) electrical signal.

12. A wireless proximity detection system in accordance with claim 8 wherein the transmitted high-power radio-frequency signal comprises a high-power microwave signal.

13. A wireless proximity detection system in accordance with claim 8 wherein said proximity probe is further configured to operate non-continuously.

14. A wireless proximity detection system in accordance with claim 8 wherein a position of the probe target is fixed when said second antenna generates the signal.

15. A method of detecting a proximity of a probe target from a wireless proximity probe, said method comprising:
   receiving, at a first antenna, a radio-frequency signal at a first predetermined frequency;
   converting the radio-frequency signal to a driving signal and an electrical signal;
   generating, at a second antenna, a signal indicative of a distance from the proximity probe to the probe target;
   modulating said generated signal at a second predetermined frequency that is different than the first predetermined frequency; and
   transmitting the modulated signal via a third antenna.

16. A method in accordance with claim 15 wherein said converting further comprises converting to the driving signal that comprises an alternating current (AC) electrical signal and converting to the electrical signal that comprises a rectified direct current (DC) electrical signal.

17. A method in accordance with claim 15 further comprising storing the electrical signal power in at least one energy storage device and using the stored power for said modulating and said transmitting.

18. A method in accordance with claim 15 wherein said receiving further comprises receiving the radio-frequency signal that comprises one or more of a high-powered microwave signal and at least one free-space radio-frequency signal.

19. A method in accordance with claim 15 further comprising non-continuously detecting the proximity of the probe target from the wireless proximity probe.

20. A method in accordance with claim 15 wherein said generating further comprises generating the signal wherein the position of the probe target is fixed when the signal is generated.

* * * * *